US008018603B2

(12) United States Patent
Honguh

(10) Patent No.: US 8,018,603 B2
(45) Date of Patent: Sep. 13, 2011

(54) PAPER TYPE DETERMINATION DEVICE

(75) Inventor: Yoshinori Honguh, Yokohama (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 12/966,140

(22) Filed: Dec. 13, 2010

(65) Prior Publication Data

US 2011/0135330 A1 Jun. 9, 2011

Related U.S. Application Data

(62) Division of application No. 11/733,950, filed on Apr. 11, 2007, now Pat. No. 7,877,055.

(51) Int. Cl.
*G01B 11/30* (2006.01)

(52) U.S. Cl. ........................................................ 356/600

(58) Field of Classification Search .................. 356/600, 356/603

See application file for complete search history.

(56) References Cited

U.S. PATENT DOCUMENTS 3,053,181 A * 9/1962 Jorgensen ..................... 101/483
5,309,258 A * 5/1994 Kouno et al. ................. 358/523
5,488,476 A * 1/1996 Mansfield et al. ............ 356/512
5,534,704 A 7/1996 Robinson et al.
2003/0194251 A1 10/2003 Maruyama et al.
2005/0078973 A1 4/2005 Suzuki
2007/0092328 A1 4/2007 Lin
2008/0173832 A1 7/2008 Chien et al.

FOREIGN PATENT DOCUMENTS

JP 2005-75469 3/2005
JP 2006-23288 1/2006
JP 2006-117363 5/2006

OTHER PUBLICATIONS

U.S. Office Action for U.S. Appl. No. 11/733,950 mailed on Nov. 27, 2009.

U.S. Office Action for U.S. Appl. No. 11/733,950 mailed on Jun. 10, 2010.

* cited by examiner

*Primary Examiner* — Roy Punnoose

(74) *Attorney, Agent, or Firm* — Turocy & Watson, LLP

(57) ABSTRACT

A paper type determination device of the invention drives plural light emitting points different from one another and having sequentially increasing distances from a reference point to emit light in such a manner that each is identified for irradiating one surface of a sheet of paper subjected to determination. A photodetection device set at a specific detection field of view having the center at the reference point is disposed on the other surface side of the sheet of paper, and it receives light having passed through the sheet of paper from the respective light emitting points at positions on inside and outside of the detection field of view to detect intensity of light for each light emitting point. A diffusing characteristic of the sheet of paper is obtained on the basis of the intensity of light from each light emitting point detected by the photodetection device, and a paper type is determined on the basis of the diffusing characteristic.

7 Claims, 6 Drawing Sheets

FIG 1A
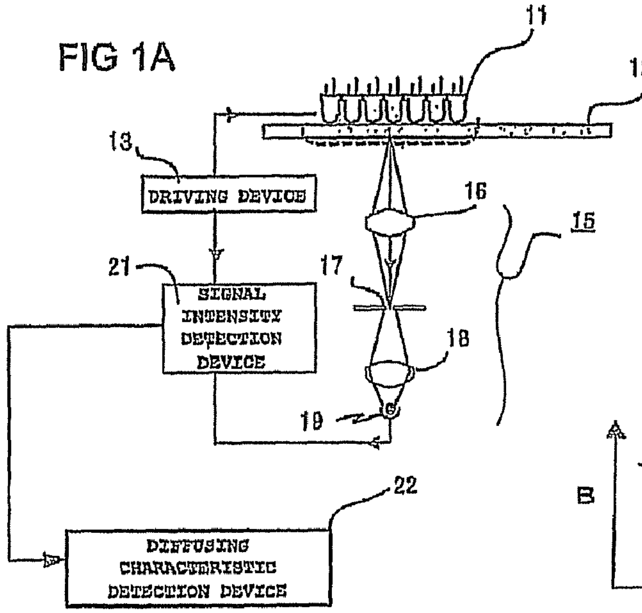
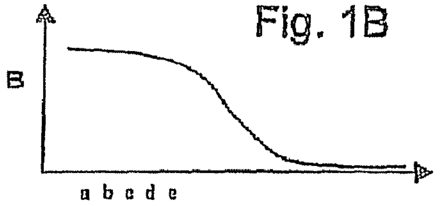
Fig. 1B
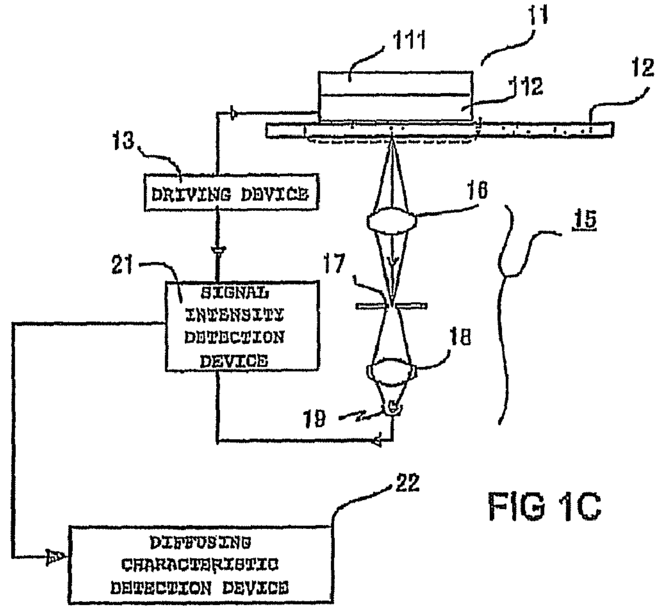
FIG 1C

PAPER TYPE DETERMINATION DEVICE

CROSS-REFERENCE TO RELATED APPLICATION

This application is a Division of application Ser. No. 11/733,950 filed on Apr. 11, 2007, the entire contents of which are incorporated herein by reference.

BACKGROUND OF THE INVENTION

1. Field of the Invention

The present invention relates to a paper type determination device used in a printer or a copying machine to determine the type of paper as a recording material subjected to printing, and an image forming apparatus using the paper type determination device.

2. Description of the Related Art

With an electrophotographic image forming apparatus, such as a copying machine and a laser printer, the type of paper used as a recording material is automatically determined and the developing condition, the transfer condition, or the fixing condition is changed according to the determined paper type.

As a device that determines the paper type, there are devices disclosed in Japanese publications of unexamined applications described in the following.

In the device described in a Japanese publication of unexamined application, JP-A-2006-117363, light is irradiated to a first surface of a recording material and an image of the first surface of the recording material is taken and light is irradiated to a second surface of the recording material and an image of the first surface is taken by an imaging device. The surface roughness is detected from the images of the recording material taken by the imaging means, and the surface roughness thus detected is compared with an initial setting threshold value used to determine plural recording materials to determine which one of the plural recording materials is the paper type of the recording material on the basis of the comparison result.

In the device disclosed in another Japanese publication of unexamined application, JP-A-2006-23288, first irradiation means for irradiating light to a recording material to obtain reflected light from the surface of the recording material is provided, and second irradiation means for irradiating light to the recording material to obtain transmitted light from the recording material is provided. In addition, reading means for reading specularly reflected light and diffusively reflected light reflected on the recording material as the result of irradiation from the first irradiation means, and specularly transmitted light and diffusively transmitted light having passed through the recording material as the result of irradiation from the second irradiation means are provided separately. The type of the recording material is determined using a ratio of reflected light of an amount of specularly reflected light and an amount of diffusively reflected light and a ratio of transmitted light of an amount of specularly transmitted light and an amount of diffusively transmitted light obtained by these means.

Further, the device disclosed in still another Japanese publication of unexamined application, JP-A-2005-75469, irradiates light to a recording material to measure light specularly reflected on the recording material. The paper type is determined by utilizing that the surface roughness varies from recording material to recording material and each recording material has different glossiness. In other words, the type of the recording medium is identified by comparing glossiness data acquired by measuring the specularly reflected light with a pre-stored threshold value. In this case, a detection error occurs when there is a variance in light receiving sensitivity at which reflected light is received. Hence, light is irradiated from a light-emitting portion in several different light-emitting amounts, and the type of the recording medium is identified according to a light receiving amount received at the light receiving portion when light is irradiated in a specific light-emitting amount.

These inventions use a CMOS sensor or plural light receiving elements, which complicates the device configuration and increases the cost. In addition, each is based on the technique to determine the type of paper using reflected light from the surface of paper. However, because this method is affected by the surface condition of paper, none of these inventions is fully acceptable as paper type determination means.

SUMMARY OF THE INVENTION

An advantage of the invention is to provide a paper type determination device configured to determine the paper type by detecting the light diffusing characteristic of paper subjected to inspection, so that it is able to determine the paper type more precisely and can be formed simply at a low cost.

A paper type determination device according to one aspect of the invention includes: a light emitting device that drives plural light emitting points different from one another and having sequentially increasing distances from a reference point to emit light in such a manner that respective light emitting points are identified for irradiating one surface of a sheet of paper subjected to determination by light emission; a photodetection device that is disposed on the other surface side of the sheet of paper, includes a specific detection field of view having a center at the reference point, and receives light having passed through the sheet of paper from the respective light emitting points at positions on inside and outside of the detection field of view to detect intensity of light for each light emitting point; and a diffusing characteristic detection device that obtains a diffusing characteristic of the sheet of paper on the basis of the intensity of light from each light emitting point detected by the photodetection device.

Further, a paper type determination device according to another aspect of the invention includes: an optical system that forms a striped pattern on one surface of a sheet of paper subjected to determination using light from a light source and changes a roughness of the striped pattern sequentially and continuously; a photodetection device that is disposed on the other surface side of the sheet of paper and detects light having passed through the sheet of paper from a specific region on the other surface; and a diffusing characteristic detection device that receives an input of an amplitude value of an output of the photodetection device and obtains a diffusing characteristic of the sheet of paper on the basis of a change in the amplitude value in association with a change in roughness of the striped pattern.

BRIEF DESCRIPTION OF THE DRAWINGS

FIG. 1A is a view schematically showing the configuration of a paper type determination device according to a first embodiment of the invention;

FIG. 1B is a characteristic view showing the diffusing characteristic of a sheet of paper in the first embodiment of the invention;

FIG. 1C is another view schematically showing the configuration of a paper type determination device according to a first embodiment of the invention;

DETAILED DESCRIPTION OF THE INVENTION

Hereinafter, embodiments of the invention will be described in detail using the accompanying drawings as examples.

Figure 2:
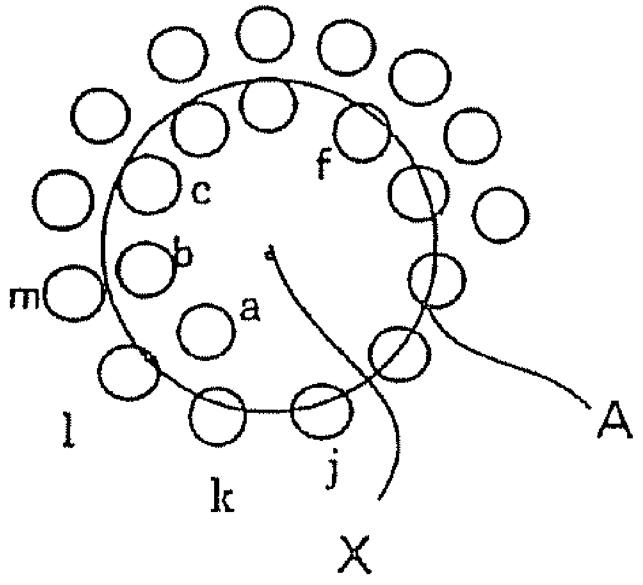
FIG. 2 is a view used to describe a relation of plural light emitting points and a detection field of view in the paper type determination device in the first embodiment of the invention.

FIG. 1A shows a paper type determination device according to a first embodiment of the invention. Referring to FIG. 1A, a light emitting device 11 has plural light emitting elements and irradiates one surface (the top surface in the drawing) of a sheet of paper 12 subjected to paper type determination by emitting light therefrom. As is shown in FIG. 2, the plural light emitting elements become plural light emitting points a, b, c, and so forth. As is shown in FIG. 2, these plural light emitting points a, b, c, and so forth are disposed at positions different from one another in such a manner that a distance from the reference point (herein, the center of a circle in the drawing) X increases for each light emitting point in sequence.

The plural light emitting points a, b, c, and so forth are formed by providing light emitting elements, for example, LED's, at respective light emitting positions. Light emission of these plural light emitting points a, b, c, and so forth is controlled in such manner that which light emitting point has emitted light is identified at the light receiving end as will be described below. The simplest method for controlling light emission is to drive the respective light emitting points a, b, c, and so forth to emit light at timings different from one another by the driving device 13, so that from which light emitting point comes the light in question is identified on the basis of the light receiving timing at the light receiving end.

A photodetection device 15 is disposed on the other surface side (on the bottom surface side in the drawing) of the sheet of paper 12 subjected to paper type determination. The photodetection device 15 includes an image forming lens 16, an aperture 17 made in a shielding plate to determine a field of view, a collective lens 18, and a photodetector 19. The image forming lens 16 forms images of rays of light emitted from the respective light emitting points a, b, c, and so forth and having passed through the sheet of paper 12 in the portion of the aperture 17. As is shown in FIG. 2, the aperture 17 defines a detection field of view A of a circular shape. Also, the aperture 17 is disposed so that the center of the detection field of view A coincides with (becomes concentric with) the reference point X. The collective lens 18 collects rays of light having passed through the aperture 17 on the light receiving surface of the photodetector 19. The photodetector 19 detects the intensity of rays of light within the detection field of view A collected by the collective lens 18.

A signal intensity detection device 21 receives from the driving device 13 an input of a timing signal to drive the respective light emitting points a, b, c, and so forth in the light emitting device 11 to emit light and captures an output signal from the photodetector 19 in sync with this timing to output the signal intensity. In other words, by receiving information about from which of the light emitting points a, b, c, and so forth comes the light received at the photodetector 19 in sync with the light emitting timing, the signal intensity detection device 21 identifies the light emitting point that has emitted the received light.

As has been described, the photodetection device 15 including the signal intensity detection device 21 receives light having passed through the sheet of paper 12 from the respective light emitting points a, b, c, and so forth positioned on the inside and outside of the detection field of view A and detects intensity of light for each of the light emitting points a, b, c, and so forth.

A diffusing characteristic detection device 22 receives an input of signal (data) corresponding to the intensity of light from the signal intensity detection device 21 and holds the signal at the positions (light emitting points a, b, c, and so forth) corresponding to the respective LED's. This signal indicates the diffusing characteristic of a sheet of paper. FIG. 1B shows the diffusing characteristic of a sheet of paper, in which the ordinate is used for the intensity of light, B, and the abscissa is used for the positions of the light emitting points a, b, c, and so forth.

In the configuration as above, the driving device 13 drives the light emitting points a, b, c, and so forth in the light emitting device 11 to emit light sequentially. To be more specific, they are driven to emit light sequentially in order of the light emitting point a having the shortest distance from the reference point X at the position concentric with the center of the detection field of view A shown in FIG. 2 and the light emitting points b, c, and so forth having sequentially increasing distances from the reference point X. Light emitted from the light emitting points a, b, c, and so forth diffuses according to the diffusing characteristic of the sheet of paper when it passes through the sheet of paper 12, and goes incident on the photodetector 19 by way of the image forming lens 16, the aperture 17, and the collective lens 18.

Of all the light emitting points a, b, c, and so forth, for the light emitting points (a through e in the case of the drawing) present completely on the inside of the detection field of view A, the detection signal (intensity of light) B from the photodetector 19 will never drop markedly. However, for the light emitting points (f and subsequent ones in the case of the drawing) having part thereof starting to lie off the detection field of view A, as is the curve shown in the drawing, the intensity of light, B, detected by the photodetector 19 starts to drop noticeably. Then, as with the light emitting point m, when the entire light emitting point goes outside of the detection field of view A, the intensity of light detected by the photodetector 19 drops markedly. However, an output of the photodetector 19 will never drop to 0 (nil). This is because light having passed through the sheet of paper is diffused not only directly below the light emitting point but also radially on the periphery owing to the diffusing characteristic of the sheet of paper, and part of light does come inside the detection field of view A even for the light emitting points (m and the subsequent ones in the case of the drawing) positioned on the outside of the detection field of view A. It should be appreciated, however, that an output of the photodetector 19 approximates to 0 with increasing distances from the detection field of view A. As has been described, by detecting the intensity of light from each of the light emitting points a, b, c, and so forth, it is possible to obtain the diffusing characteristic (the curve of FIG. 1B) of the sheet of paper 12 in the diffusing characteristic detection device 22.

In a case where the sheet of paper 12 is close to transparent and the light diffusivity is low, rays of light from the light emitting points (a through e in the case of the drawing) present on the inside of the detection field of view A are inputted directly and individually to the photodetector 19, and the detection signals (the intensity of light) thereof maintain a large value. For the light emitting points (f and the subsequent ones in the case of the drawing), which are the light emitting points having part thereof starting to lie off the detection field of view A, the intensity of light detected by the photodetector 19 drops abruptly. For the light emitting points that entirely go outside of the detection field of view A like the light emitting point m, light hardly goes incident on the photodetector 19, and the values of the detection signals approximate to 0. In short, the curve of the diffusing characteristic changes significantly at a sharp angle.

On the contrary, in a case where the light diffusivity of the sheet of paper 12 is large, even rays of light from the light emitting points (a through e in the case of the drawing) present on the inside of the detection field of view A diffuse to the outside of the detection field of view A and generate a portion that is not inputted into the photodetector 19. The detection signals (the intensity of light) therefore take a relatively small value. Also, from the light emitting points (f and the subsequent ones in the case of the drawing), which are the light emitting points having part thereof starting to lie off the detection field of view A, the intensity of light detected by the photodetector 19 starts to drop. However, when the light diffusivity of the sheet of paper 12 is large, part of light from the portion lying off the detection field of view A goes incident on the photodetector 19 owing to the diffusing effect. Hence, a degree of drop becomes moderate. Even for the light emitting points that entirely go outside of the detection field of view A like the light emitting point m, because part of light goes incident on the photodetector 19 owing to the diffusing effect, a certain level of detection signal is outputted. In other words, the curve of the diffusing characteristic keeps dropping gently within a relatively small range until the value of the detection signal takes a value close to 0.

As has been described, because the diffusing characteristics that vary with the types of paper can be obtained, by measuring the diffusing characteristic of every paper type in advance to be stored, it is possible to determine the paper type having the most similar diffusing characteristic as being the paper type of the sheet of paper 12 subjected to determination by comparing the detected diffusing characteristic with the pre-stored diffusing characteristics (data) of the respective paper types.

In other words, by pre-storing plural diffusing characteristics into the diffusing characteristic detection device 22 and comparing the obtained diffusing characteristic (data) with the pre-stored diffusing characteristics (data), a paper type having the diffusing characteristic closest to the obtained diffusing characteristic is specified, and the paper type thus specified is determined as being the paper type of the sheet of paper subjected to determination.

Because the paper type is determined by allowing light to pass through a sheet of paper and obtaining the diffusing characteristic for the light as described above, it is possible to determine the paper type precisely without being affected by the surface condition of a sheet of paper as was the case in the related art. In addition, there is no need to use a large-scaled and expensive device, such as an image sensor, at the light receiving end, and it is therefore sufficient to provide a single light receiving element as the photodetector 19. The device is thus simplified and can be formed at a low cost.

In the example described above, light emitting elements, such as LED's, are provided at the respective light emitting points as the plural light emitting points a, b, c, and so forth in the light emitting device 11. However, it may be of another configuration. For example, as shown in FIG. 1C, it may be formed of a common light source 111 and a spatial modulator 112 capable of forming light emitting points at positions different from one another. As the spatial modulator 112, a liquid crystal panel capable of forming a light transmitting point at an arbitrary point is preferably used.

As the method of identifying the light emitting point, the light emitting points are driven to emit light sequentially one by one in the example described above. However, another method may be used. For example, in the light emitting device 11, the respective light emitting points a, b, c, and so forth are driven to emit light at frequencies different from one another, and a wave filter circuit that distinguishes the frequency of light received at the photodetector 19 is provided to the photodetection 15, so that from which light emitting point comes the light in question is identified on the basis of the distinguished frequency. As the intensity of light, the amplitude value of light that blinks at a specific frequency is measured for each light emitting point by the signal intensity detection device 21, and the diffusing characteristic (the curve shown in the drawing) of the sheet of paper is obtained by the diffusing characteristic detecting device 22 on the basis of the intensity of light (the amplitude value) from each of the light emitting points a, b, c, and so forth.

When configured in this manner, there is no need to emit light from the light emitting points a, b, c, and so forth one by one, and even when they are driven to emit light in units of several light emitting points, the respective light emitting points can be identified individually and detected in correspondence with the intensity of light (the amplitude value).

As another method, the respective light emitting points a, b, c, and so forth in the light emitting device 11 are driven to emit light using digital waves having waveforms different from one another, and a waveform detection circuit is provided to the photodetection device 15, so that from which light emitting point comes the light in question is identified on the basis of the waveform received at the photodetector 19. In other words, by combining plural rectangular waveforms having different wavelengths, it is possible to shape digital waves having various waveforms. Hence, by driving the respective light emitting points a, b, c, and so forth to emit light using the digital waves having waveforms different from one another, it is possible to identify from which light emitting point comes the light in question at the light receiving end. In this case, too, there is no need to emit light from the light emitting points a, b, c, and so forth one by one, and even when they are driven to emit light in units of several light emitting points, it is possible to identify precisely from which light emitting point comes the light in question.

A second embodiment of the invention will now be described. In this embodiment, a striped pattern is used instead of the plural light emitting points. To be more specific, a striped pattern is irradiated to one surface of a sheet of paper subjected to determination and how sharply the striped pattern can be seen on the other surface of the sheet of paper is checked, and the paper type is determined by obtaining a signal reflecting the diffusing characteristic of the sheet of paper.

Figure 3A:
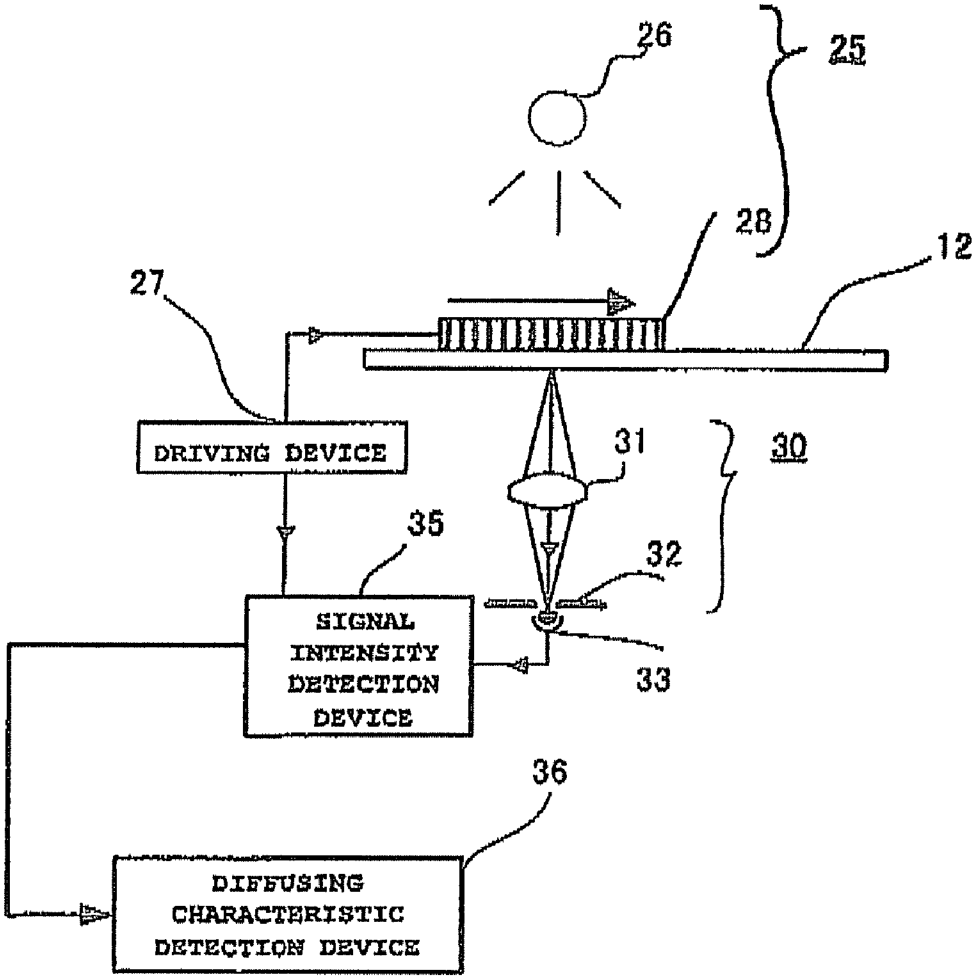
FIG. 3A is a view schematically showing the configuration of a paper type determination device according to a second embodiment of the invention.

FIG. 3A shows a paper type determination device according to the second embodiment of the invention. Referring to FIG. 3A, an optical system 25 for forming a striped pattern forms a striped pattern on one surface of a sheet of paper 12 subjected to determination with light emitted from a light source 26. Also, the optical system 25 is configured in such a manner that the roughness of the striped pattern formed on one surface of the sheet of paper 12 is changed sequentially and continuously by a driving device 27. In the optical system 25, a simplest device to change the roughness of the striped pattern sequentially and continuously is to move a pattern member 28 having a striped pattern whose roughness varies sequentially in the direction indicated by an arrow on one surface of the sheet of paper 12 by means of the driving device 27, so that the striped pattern is scrolled for the roughness of the striped pattern to change continuously from rough to dense.

As a configuration to scroll the striped pattern, besides the configuration to physically move the pattern member 28 as has been described, a display panel (for example, a light transmissive liquid crystal panel) capable of forming an arbitrary pattern image thereon may be used as the pattern member 28, so that the pattern image is formed on one surface of the sheet of paper 12. In this case, a change of the striped pattern from rough to dense is achieved by electronically scrolling the pattern image of the striped pattern formed by the display panel 28. In this case, because the pattern member 28 is a display panel, such as a liquid crystal panel, the driving device 27 having the capability of controlling a display on the display panel 28 is used in FIG. 3A.

A photodetection device 30 is disposed on the other surface side (the bottom surface side in the drawing) of the sheet of paper 12 subjected to paper type determination. The photodetection device 30 has an image forming lens 31, a pin-hole 32 made in a shielding plate, and a photodetector 33. The image forming lens 31 forms an image of a striped pattern formed on the sheet of paper 12 by the optical system 25 and having passed through the sheet of paper 12 on the light receiving surface of the photodetector 33 via the pin-hole 32. The photodetector 33 detects the strength of a change in contrast (how sharply the image can be seen) of the striped pattern whose image is formed by the image forming lens 31, and the degree of strength is expressed by the amplitude value of the detection signal. In other words, the photodetection device 30 detects the strength of a change in contrast of light (striped pattern) having passed through the sheet of paper 12 by coming out from a specific region on the other surface of the sheet of paper 12.

A signal intensity detection device 35 receives an input of a signal indicating the degree of density (spatial frequency F of contrast: also the scroll position of the striped pattern) of the striped pattern currently formed on the sheet of paper 12 from the driving device 27 that changes the roughness of the striped pattern, and captures an output signal of the photodetector 33 in sync with the degree of density to output the signal intensity. In other words, the signal intensity detection device 35 detects the intensity of contrast (amplitude value) of light received at the photodetector 33 in sync with the spatial frequency of contrast of the striped pattern.

Figure 3B:
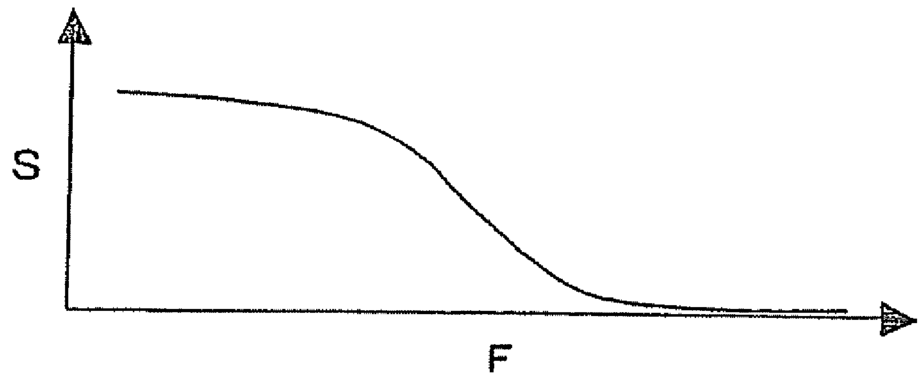
FIG. 3B is a characteristic view showing the diffusing characteristic of a sheet of paper in the second embodiment of the invention.

A diffusing characteristic detection device 36 receives an input of a signal (data) corresponding to a detection from the signal intensity detection device 35, and holds the signal to correspond to the spatial frequency F of contrast induced by the striped pattern. This signal indicates the diffusing characteristic of the sheet of paper 12. FIG. 3B shows the diffusing characteristic of the sheet of paper, in which the ordinate is used for the strength (amplitude value) S of contrast of light and the abscissa is used for the spatial frequency F of contrast.

In the configuration described above, the optical system 25 forms a striped pattern on one surface of the sheet of paper 12 using the light source 26 and the pattern member 28. The driving device 27 scrolls the striped pattern formed on the sheet of paper 12 so as not only to change a contrast state but also to change a state of the striped pattern from rough to dense. The striped pattern formed on the sheet of paper 12 passes through the sheet of paper 12, after which it passes through the pin-hole 32 and an image thereof is formed on the light receiving surface of the photodetector 33 on the other surface side by the image forming lens 31.

The striped pattern received at the photodetector 33 changes alternately from bright to dark and dark to bright as being scrolled. Hence, the detection signal from the photodetector 33 oscillates in association with a change of the received striped pattern from bright to dark and vice versa. As is shown in FIG. 3B, with the detection signal of the photodetector 33, in a case where the striped pattern is rough and the spatial frequency F of contrast is low, the amplitude S becomes large because an amount of incident light in a bright state increases. On the contrary, in a case where the striped pattern is fine and the spatial frequency F of contrast is high, the amplitude S becomes small because a difference between bright and dark becomes small. Hence, by adopting the amplitude S of the diction signal from the photodetector 33 in response to the spatial frequency F of contrast induced by the striped pattern, the curve shown in FIG. 3B is obtained as the diffusing characteristic of the sheet of paper 12.

In a case where the sheet of paper 12 is close to transparent and the diffusivity of light is low, the curve shows a relatively large change because the striped pattern can be seen sharply. On the contrary, in a case where the light diffusing characteristic of the sheet of paper 12 is high, the striped pattern having passed through the sheet of paper blurs due to the diffusion of light. Hence, even in a case where the striped pattern is rough and the spatial frequency of contrast is low, a difference between bright and dark becomes small. This tendency becomes more noticeable when the striped pattern is finer and the spatial frequency of contrast becomes higher. Consequently, the curve indicating a change of the amplitude of the detection signal of the photodetector 19 with respect to the spatial frequency of contrast becomes gentler. In short, as the diffusivity of the sheet of paper 12 becomes higher, the curve shown in FIG. 3B becomes a gentler curve having a smaller change.

As has been described, because the diffusing characteristics that vary with the types of paper can be obtained, by measuring the diffusing characteristic of every paper type in advance to be stored, it is possible to specify the paper type having the most similar diffusing characteristic by comparing the detected diffusing characteristic (data) with the pre-stored diffusing characteristics (data) of the respective paper types. The paper type thus specified is determined as being the paper type of a sheet of paper subjected to determination.

In other words, by pre-storing plural diffusing characteristics into the diffusing characteristic detection device 36, it is possible to determine the paper type having the most similar diffusing characteristic obtained by comparing the obtained diffusing characteristic with the pre-stored diffusing characteristics as being the paper type of the sheet of paper subjected to determination.

As has been described, because the paper type is determined by allowing light to pass through a sheet of paper and obtaining the diffusing characteristic for the light, it is possible to determine the paper type precisely without being affected by a surface condition of the sheet of paper as was the case in the related art. In addition, there is no need to use a large-scaled and expensive device, such as an image sensor, at the light receiving end, and it is therefore sufficient to provide a single light receiving element as the photodetector 33. The device is thus simplified and can be formed at a low cost.

In the example described above, the striped pattern is scrolled as the method of changing the striped pattern from bright to dark and vice versa. However, another method may be used. For example, a bright portion and a dark portion in a pattern image of the striped pattern formed by the display panel 28 may be inverted in specific cycles using the display control capability of the driving device 27. In this case, the roughness of the striped pattern can be changed sequentially, that is, the spatial frequency of contrast can be changed easily by changing the contrast inverting cycle described above.

A case where the paper type determination device described above is applied to an image forming apparatus will now be described.

Figure 4:
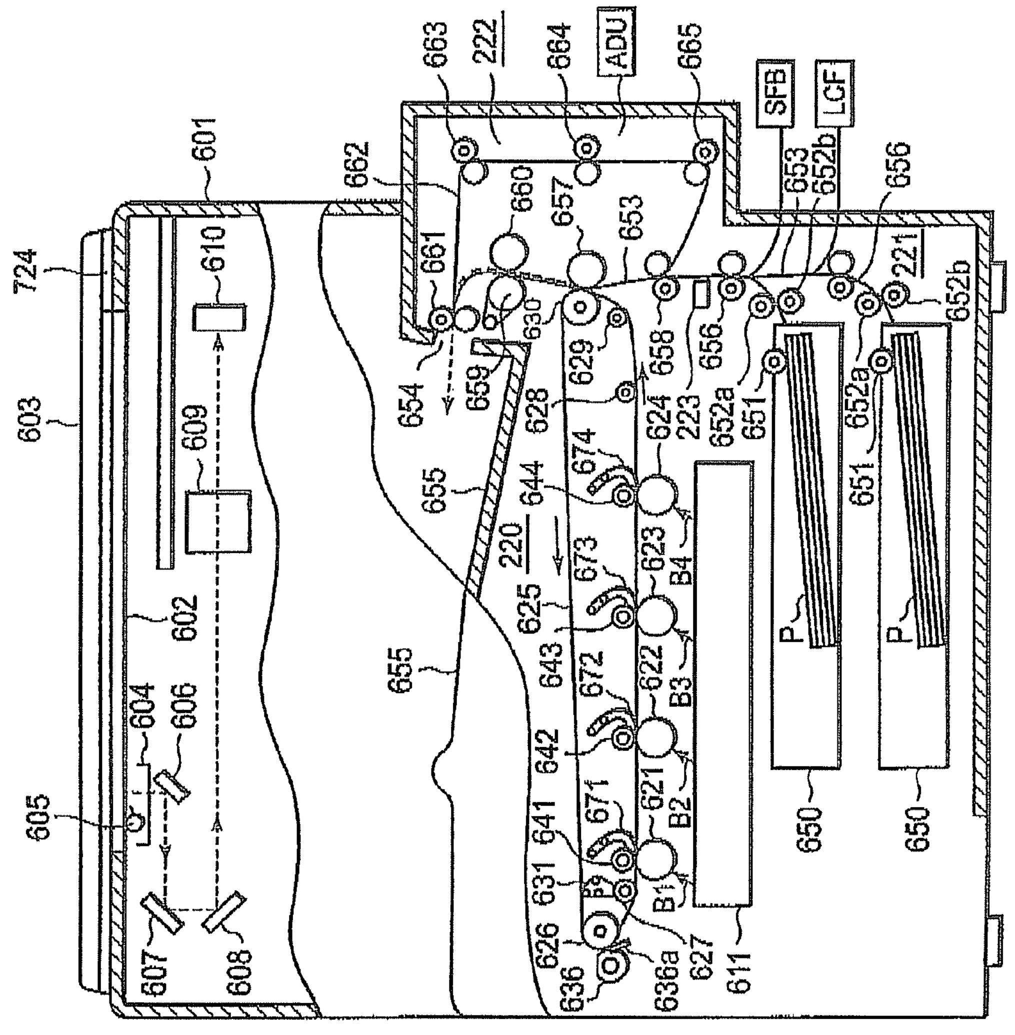
FIG. 4 is a view showing the configuration of an image forming apparatus according to a third embodiment of the invention.

FIG. 4 is a view showing an example of the configuration of the image forming apparatus. As is shown in FIG. 4, an original document table 602 made of a transparent material, for example, a glass plate, for placing thereon an original document is provided at the top of an apparatus main body 601. Also, a cover 603 is provided to the apparatus main body 601 in an openable and closable manner to cover the original document table 602.

A scan unit that optically reads an image on the original document placed on the original document table 602 is provided on the bottom surface side of the original document table 602 inside the apparatus main body 601. For example, the scan unit has a carriage 604, reflection mirrors 606, 607, and 608 that reflect light emitted from an exposing lamp 605 and reflected on an original document, a magnifying lens block 609 that magnifies reflected light, and a CCD (Charge Coupled Device) 610. The carriage 604 includes an exposing lamp 605 that irradiates light toward the original document table 602, and it is configured to be able to reciprocate along the bottom surface of the original document table 602.

The carriage 604 exposes an original document placed on the original document table 602 to light by reciprocating while keeping the exposing lamp 605 lit ON. An image of the reflected light from the original document placed on the original document table 602 by this exposure is projected onto the CCD 610 by way of the reflection mirrors 606, 607, and 608 and the magnifying lens block 609. The CCD 610 outputs an image signal corresponding to the projected image of reflected light from the original document.

An image forming portion 220 is provided below the scan unit inside the apparatus main body 601. The image forming portion 220 includes, for example, a print engine and a process unit.

The print engine includes an exposing unit 611. The process unit includes photoconductive drums 621, 622, 623, and 624 disposed along the exposing unit 611, an endless transfer belt 625 disposed oppositely to the exposing unit 611 with the photoconductive drums 621, 622, 623, and 624 in between, a drive roller 626 that drives the transfer belt 625, a primary transfer rollers 641, 642, 643, and 644 disposed oppositely to the photoconductive drums 621, 622, 623, and 624, respectively, with the transfer belt 625 in between, and a transfer roller driving unit that drives the primary transfer rollers 641, 642, 643, and 644.

The transfer belt 625 is stretched over the drive roller 626, guide rollers 627, 628, and 629, and a driven roller 630, and runs to rotate in a counterclockwise direction upon receipt of motive power from the drive roller 626. The guide roller 627 is provided so as to be able to move up and down, and moves toward the transfer belt 625 upon receipt of turning of a cam 631. Accordingly, the guide roller 627 causes the transfer belt 625 to undergo displacement toward the photoconductive drums 621, 622, 623, and 624.

The image forming portion 220 forms an image according to image data (an image signal outputted from the CCD 610), and executes an image forming process to print the image on a sheet of paper being carried. To be more specific, an image signal outputted from the CCD 610 is processed appropriately and then supplied to the exposing unit 611. The exposing unit 611 emits a laser beam B1 corresponding to an image signal for yellow color to the photoconductive drum 621 for yellow color, a laser beam B2 corresponding to an image signal for magenta color to the photoconductive drum 622 for magenta color, a laser beam B3 corresponding to an image signal for cyan color to the photoconductive drum 623 for cyan color, and a laser beam B4 corresponding to an image signal for black color to the photoconductive drum 624 for black color.

By being moved (moved down) toward the transfer belt 625, the primary transfer rollers 641, 642, 643, and 644 bring the transfer belt 625 into contact with the photoconductive drums 621, 622, 623, and 624, respectively, so that visible images on the photoconductive drums 621, 622, 623, and 624 are transferred onto the transfer belt 625.

Unillustrated drum cleaner, erasing lamp, charging unit, and developing unit are sequentially provided on the periphery of the photoconductive drum 621. The drum cleaner has a drum cleaning blade that comes into contact with the surface of the photoconductive drum 621, and scrapes off a developing material remaining on the surface of the photoconductive drum 621 using the drum cleaning blade.

The erasing lamp erases charges remaining on the surface of the photoconductive drum 621. By applying a high voltage to the photoconductive drum 621, the charging unit positively charges the surface of the photoconductive drum 621. The laser beam B1 emitted from the exposing unit 611 is irradiated onto the charged surface of the photoconductive drum 621. As the result of this irradiation, an electrostatic latent image is formed on the surface of the photoconductive drum 621. The developing unit turns the electrostatic latent image on the photoconductive drum 621 into a visible image by supplying a developing material (toner particles) in yellow color to the surface of the photoconductive drum 621.

Likewise, the other photoconductive drums 622, 623, and 624 turn electrostatic latent images on the surfaces of the photoconductive drums 622, 623, and 624 into visible images using developing materials in the corresponding colors.

At the position opposing the drive roller 626 in the image forming portion 220, a cleaner 636 is provided with the transfer belt 625 in between. The cleaner 636 has a cleaning blade 636*a* that comes into contact with the transfer belt 625, and scrapes off a developing material remaining on the transfer belt 625 using the cleaning blade 636*a*.

The print mode is changed as follows. Hooks 671, 672, 673, and 674 are provided in close proximity to the primary transfer rollers 641, 642, 643, and 644, respectively. The hooks 671, 672, 673, and 674 engage, respectively, with the shafts of the primary transfer rollers 641, 642, 643, and 644 to lift up the corresponding shafts while they rotate, so that they move the primary transfer rollers 641, 642, 643, and 644 in directions to be spaced apart from the photoconductive drums 621, 622, 623, and 624, respectively. The print mode is changed to a full-color mode, a totally spaced-apart mode, and a monochrome mode by moving none of the primary transfer rollers 641, 642, 643, and 644 or by changing a combination of rollers to be moved.

Paper accommodation mechanism and feeding mechanism will now be described. Plural paper cassettes 650 to accommodate sheets of paper therein are provided below the exposing unit 611. A large number of sheets of paper P of different paper types in a stacked state are accommodated in these paper cassettes 650. A paper feeding mechanism 221 that feeds sheets of paper one by one from the top of sheets of paper within the paper cassette 650 is provided at an outlet portion (on the right in the drawing) of each paper cassette 650. Sheets of paper P are taken out one by one from either one of the paper cassettes 650 by the corresponding paper feeding mechanism 221. Each of the taking-out paper feeding mechanisms 221 includes a pickup roller 651, a paper feeding roller 652*a*, and a separation roller 652*b*, and separates sheets of paper P taken out from the paper cassette 650 and feeds them one by one to a paper carrying path 653.

The paper carrying path will now be described. The paper carrying path 653 extends to a paper discharge port 654 at the top by way of the driven roller 630 in the image forming portion 220. The paper discharge port 654 faces a paper discharge portion 655 that continues to the outer peripheral surface of the apparatus main body 601. In addition, a carrying roller pair 656 is provided in close proximity to each paper feeding mechanism 221 at the start end of the carrying path 653. When a sheet of paper is fed from either one of the paper feeding mechanisms 221, the paper carrying path 653 carries the fed sheet of paper to the paper discharge portion 655.

In addition, a secondary transfer roller 657 is provided at a position opposing the driven roller 630 with the transfer belt 625 in between somewhere in the middle of the paper carrying path 653. A registration roller pair 658 is provided at a position upstream from the driven roller 630 and the secondary transfer roller 657 in the carrying direction.

The registration roller pair 658 sends a sheet of paper P into a space between the transfer belt 625 and the secondary transfer roller 657 at timing in sync with a transfer operation, which is an operation to transfer an image formed of a developing material (toner particles) onto a sheet of paper by the transfer belt 625 and the secondary transfer roller 657. The secondary transfer roller 657 executes printing by transferring a visible image formed of a developing material (toner particles) and transferred onto the transfer belt 625 onto the sheet of paper P while sandwiching the sheet of paper P sent from the registration roller pair 658 with the transfer belt 625 on the driven roller 630. As has been described, the registration roller pair 658 carries the sheet of paper P to the image forming unit 220 having the transfer belt 625 and the secondary transfer roller 657 in sync with the transfer operation of the image forming portion 220.

A thermal fixing heat roller 659 and a press roller 660 that comes into contact with the heat roller 659 are provided in the paper carrying path 653 at a position downstream from the secondary transfer roller 657. An image transferred onto the sheet of paper P is fixed thereon by the heat roller 659 and the press roller 660. A paper discharge roller pair 661 is provided at the terminal end of the paper carrying path 653.

An automatic duplex unit (hereinafter, abbreviated to ADU) 222 may be provided to the apparatus main body 601. The ADU 222 is provided for the terminal end of the paper carrying path 653 and the inlet of the registration roller pair 658 to communicate with a sub-carrying path 662, which is a path to carry a sheet of paper P inside the ADU 222. The sub-carrying path 662 branches from the paper carrying path 653 at the downstream end with respect to the image forming portion 220 (the terminal end of the paper carrying path 653) and merges with the paper carrying path 653 at the upstream end with respect to the image forming portion 220 (the position upstream from the registration roller pair 658).

The sub-carrying path 662 is used to turn over the sheet of paper P for duplex printing. The sub-carrying path 662 is provided with paper feeding roller pairs 663, 664, and 665, and the ADU 222 carries backward the sheet of paper P being carried to the paper discharge portion 655 from the image forming portion 220, so that it is carried through the sub-carrying path 662 to go into the paper carrying path 653 at the upstream end of the image forming portion 220. When carried in this manner, the sheet of paper P is turned over.

After the sheet of paper P returned to the upstream end of the image forming portion 220 by the sub-carrying path 662 goes into the paper carrying path 653, it is sent to the transfer position at which the transfer belt 625 and the secondary transfer belt 657 come into contact with each other in sync with the transfer operation of the image forming portion 220 by the registration roller pair 658. In this manner, a visible image on the transfer belt 625 is also transferred onto the back surface of the sheet of paper P and printed thereon.

The sub-carrying path 662 in the ADU 222 shifts to a state where it performs an operation to turn over the sheet of paper P as described above when duplex printing is specified from a computer or the like connected to the apparatus main body 601 by way of an operation panel 724 provided to the apparatus main body 601 or via the network.

A device additionally provided will now be described. In the example of the apparatus main body 601 shown in FIG. 4, two paper cassettes 650 are provided as paper feeding sources. However, three or more paper cassettes 650 may be provided to the apparatus main body 601. In addition, although it is not shown in the drawing, a manual paper feeding mechanism (hereinafter, referred to as the SFB) or a paper feeder of a large capacity (hereinafter, referred to as the LCF) that is a paper feeding mechanism capable of accommodating a stack of several thousands of sheets of paper may be provided. These SFB and LCF are provided to the apparatus main body 601 in such a manner that their paper feeding paths merge with the paper carrying path 653.

Figure 5:
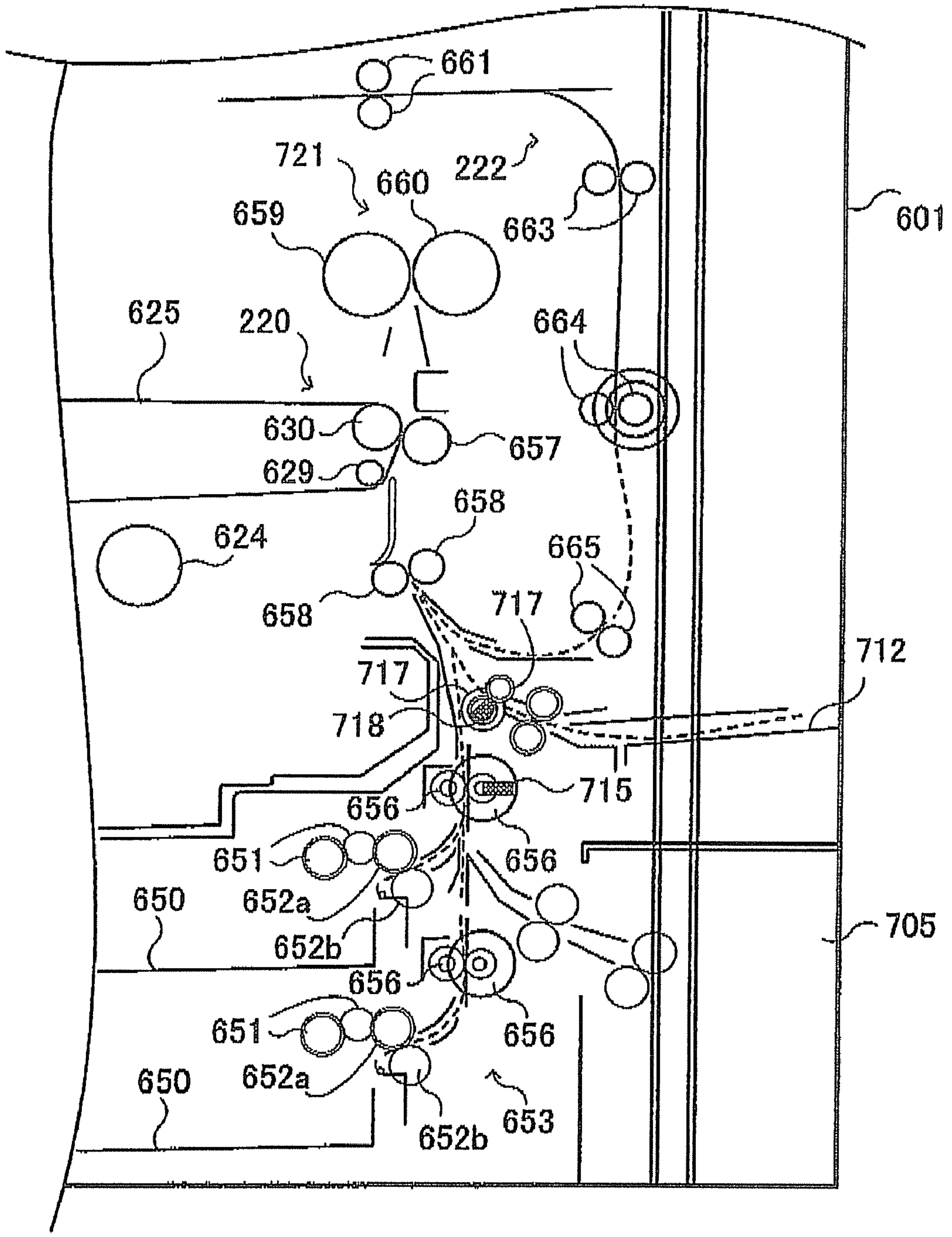
FIG. 5 is a view showing the configuration of a paper feeding portion in the image forming apparatus in the third embodiment of the invention.

The installment position of the paper type determination device will now be described. FIG. 5 is a view showing in detail a portion in close proximity to the paper carrying path 653. Hereinafter, the heat roller 659 and the press roller 660 are collectively referred to as a fixing portion 721. The fixing portion 721 fixes a developing material (toner particles) onto a recording medium P on which is transferred the developing material by carrying the sheet of paper P while the sheet of paper P is heated by the heat roller 659 and a pressure is applied thereto by the press roller 660.

Although it is not shown in the drawing, a control portion is provided to the apparatus main body 601. The control portion can be formed of, for example, a CPU, a memory, such as a ROM, and a RAM, and an LSI. The control portion controls the temperature of the heat roller 659. For example, the heat roller 659 stands by while maintaining a pre-determined temperature in response to the type of the sheet of paper P in a case where there is no signal from the control portion, and in a case where it receives a signal instructing to start the fixing, it changes the temperature according to the instruction.

Because the apparatus main body 601 is configured as described above to fix the developing material, the paper type determination device is installed upstream from the fixing portion 721 in the paper carrying path 653.

In a case where a single paper type determination device is used, it is installed at a first installment position 223 shown in FIG. 4. The first installment position 223 is a position in the paper carrying path 653 upstream with respect to the image forming portion 220 and upstream from the registration roller pair 658. In a case where the SFB 712 or the LCF 705 is provided, the first installment position 223 is a position downstream from the merging point of the paper feeding paths from the SFB 712 and the LCF 705 and the paper carrying path 653. The paper type determination device is installed to face the surface of a sheet of paper being carried.

By installing the paper type determination device at the first installment position 223, it is possible to detect the type of a recording medium P carried through the recording medium carrying path 653 from all the feeding sources of the recoding media by a single paper type determination device.

For some type of the image forming apparatus, there is a case where the paper type determination device cannot be installed at the first installment position 223 due to the relation of the arrangement of the respective components inside the apparatus main body 601. Also, there is a type to which the SFB 712 is attached as an option. In such a case, the paper type determination device can be provided to two points specified below.

A description will be given using FIG. 5. A second installment position 715 is in the paper carrying path 653 and it is a position upstream from the image forming portion 220 in the paper carrying path 653 and upstream from the registration roller pair 658, and it is also a position downstream from the paper feeding roller 652*a* and the separation roller 652*b* for the cassette device 650 at the uppermost stage and downstream from the merging position of the paper feeding path from the LCF 705 and the paper carrying path 653. The paper type determination device is installed to face the surface of a sheet of paper being carried. The paper type determination device may be installed in close proximity to a carrying roller pair 656 present at the second installment position 715.

A third installment position 718 is a position upstream from the merging position of the paper feeding path from the SFB 712 and the paper carrying path 653. The paper type determination device is installed to face the surface of a sheet of paper being carried. The paper type determination device may be provided in close proximity to a carrying roller pair 717 present at the third installment position 718.

By installing the paper type determination devices at the second installment position 715 and the third installment position 718, it is possible to achieve an effect that the paper type determination device is installed at the installment position 718 when the need arises in the image forming apparatus of a type to which the SFB 712 is attached as an option.

An applied example regarding the processing of a signal indicating the determination result and outputted from the paper type determination device will now be described. The operation panel 724 used to choose the type of a sheet of paper P and to make an input for displaying the information or setting the data is attached to the top surface of the apparatus main body 601. The control panel 724 is connected to the control portion. The control portion controls speeds of motors that drive the respective rollers to rotate for carrying a sheet of paper, and it also suspends and resumes the carrying of a sheet of paper.

Initially, the control portion stores the default type of paper or the type of paper inputted from the operation panel 724 into the memory as the set paper and sets the stand-by temperature of the heat roller 659 corresponding to this paper.

Subsequently, a paper recording medium P is carried and the paper type determination device determines the type of the recording medium P. The paper type determination device then outputs a signal indicating the determination result to the control portion. The control portion sets, for example, the carrying speed of a sheet of paper, the rotating speed of the fixing portion 721, the temperature of the heat roller 659 during the fixing according to the determination result, and transmits instructions to these components.

As has been described, in the image forming apparatus of this application example, the set paper is set first, and the conditions, such as the speed and the temperature during the fixing, are set further according to the type of paper determined by the paper type determination device. Hence, there is an effect that it is possible to set the conditions during fixing in detail according to the type of paper and to execute the fixing swiftly.

What is claimed is:

1. A paper type determination device, comprising:

an optical system that forms a striped pattern on one surface of a sheet of paper subjected to determination using light from a light source and changes a roughness of the striped pattern sequentially and continuously;

a photodetection device that is disposed on the other surface side of the sheet of paper and detects light having passed through the sheet of paper from a specific region on the other surface; and a diffusing characteristic detection device that receives an input of an amplitude value of an output of the photodetection device and obtains a diffusing characteristic of the sheet of paper on the basis of a change in the amplitude value in association with a change in roughness of the striped pattern.

2. The paper type determination device according to claim 1, wherein:

the optical system changes the striped pattern by scrolling the striped pattern having the roughness that varies sequentially on one surface of the sheet of paper.

3. The paper type determination device according to claim 1, wherein:

the optical system changes the striped pattern by sequentially changing the roughness of the striped pattern while inverting the striped pattern.

4. The paper type determination device according to claim 1, wherein:

the optical system forms the striped pattern using a display panel capable of forming an arbitrary pattern.

5. The paper type determination device according to claim 4, wherein:

the display panel is a light transmissive liquid crystal panel.

6. The paper type determination device according to claim 1, wherein:

the diffusing characteristic detection device has a capability of determining a paper type of the sheet of paper by comparing the obtained diffusing characteristic with pre-stored diffusing characteristics of respective paper types.

7. An image forming apparatus that forms an image on a sheet of paper, comprising:

a paper feeding mechanism that feeds sheets of paper one by one;

a paper carrying path that carries a sheet of paper fed from the paper feeding mechanism to a paper discharge portion;

an image forming portion that is disposed upstream from the paper discharge portion in the paper carrying path and executes an image forming process to print an image according to image data on the sheet of paper carried by the paper carrying path;

a fixing portion that fixes a developing material on the sheet of paper at a specific temperature;

a paper type determination device that is provided upstream from the fixing portion in the paper carrying path and detects a type of the sheet of paper; and a control portion that changes a condition under which the image forming process is executed in response to the type of the sheet of paper determined by the paper type determination device, wherein the paper type determination device comprises:

an optical system that forms a striped pattern on one surface of a sheet of paper subjected to determination using light from a light source and changes a roughness of the striped pattern sequentially and continuously;

a photodetection device that is disposed on the other surface side of the sheet of paper and detects light having passed through the sheet of paper from a specific region on the other surface; and a diffusing characteristic detection device that receives an input of an amplitude value of an output of the photodetection device and obtains a diffusing characteristic of the sheet of paper on the basis of a change in the amplitude value in association with a change in roughness of the striped pattern.

* * * * *